US012606185B2

(12) United States Patent
Kim

(10) Patent No.: US 12,606,185 B2
(45) Date of Patent: Apr. 21, 2026

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Hyun Mok Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 303 days.

(21) Appl. No.: 18/078,778

(22) Filed: Dec. 9, 2022

(65) Prior Publication Data

US 2023/0398867 A1 Dec. 14, 2023

(30) Foreign Application Priority Data

Jun. 8, 2022 (KR) ........................ 10-2022-0069634

(51) Int. Cl.
B60K 35/00 (2024.01)
B60K 35/10 (2024.01)
(Continued)

(52) U.S. Cl.
CPC ........... B60W 50/085 (2013.01); B60K 35/10 (2024.01); B60K 35/80 (2024.01); B60W 50/14 (2013.01);
(Continued)

(58) Field of Classification Search
CPC ........ B60K 35/00; B60K 35/22; B60K 35/28; B60K 2360/16; B60K 2360/592;
(Continued)

(56) References Cited

U.S. PATENT DOCUMENTS

| | | | | |
|---|---|---|---|---|
| 8,930,067 B1 * | 1/2015 | Green | ................. | H04W 12/084 |
| | | | | 705/7.41 |
| 9,575,743 B1 * | 2/2017 | Chun | ...................... | G06F 8/654 |

(Continued)

FOREIGN PATENT DOCUMENTS

| | | | | | |
|---|---|---|---|---|---|
| KR | 20150054733 A | * | 5/2015 | ........... | G06F 21/602 |
| KR | 20160122389 A | * | 10/2016 | ............. | B60R 16/02 |

OTHER PUBLICATIONS

Machine Translation of KR20160122389 (Year: 2016).*
Machine Translation of KR20150054733 (Year: 2015).*

*Primary Examiner* — Anne Marie Antonucci
*Assistant Examiner* — Jordan T Smith
(74) *Attorney, Agent, or Firm* — Lempia Summerfield Katz LLC

(57) ABSTRACT

A vehicle includes a communicator, an audio/video/navigation (AVN) terminal, and a controller configured to: control the communicator to request account information from a server in which the vehicle is registered among account information subscribed to a connected car service when updating software of the AVN terminal; control the AVN terminal to display the account information received from the server; control the communicator to request identity authentication from the server for account information selected by a user from the account information displayed on the AVN terminal, and link the vehicle with the account information received from the server and selected by the user based on information on whether authentication has been completed.

20 Claims, 9 Drawing Sheets

(51) Int. Cl.

| | |
|---|---|
| *B60K 35/80* | (2024.01) |
| *B60W 50/08* | (2020.01) |
| *B60W 50/14* | (2020.01) |
| *B60K 35/22* | (2024.01) |
| *B60K 35/23* | (2024.01) |
| *B60K 35/28* | (2024.01) |

(52) U.S. Cl.
CPC .............. *B60K 35/22* (2024.01); *B60K 35/23* (2024.01); *B60K 35/28* (2024.01); *B60K 2360/16* (2024.01); *B60W 2050/146* (2013.01)

(58) Field of Classification Search
CPC .... B60K 2360/62; B60K 35/29; B60K 35/85; B60W 50/085; B60W 50/14; B60W 2050/146; G06Q 50/40; H04W 12/06
See application file for complete search history.

(56) References Cited

U.S. PATENT DOCUMENTS

| | | | |
|---|---|---|---|
| 2014/0165159 A1* | 6/2014 | Baade ..................... | H04L 63/08 |
| | | | 726/4 |
| 2018/0097804 A1* | 4/2018 | Boehm ................ | G06Q 20/145 |
| 2019/0122470 A1* | 4/2019 | Endo .................... | B60R 25/209 |
| 2021/0110503 A1* | 4/2021 | Koda .................... | G06Q 40/08 |
| 2021/0182049 A1* | 6/2021 | Harata ....................... | G06F 8/65 |
| 2021/0206268 A1* | 7/2021 | Bayer ................... | B60K 35/80 |
| 2021/0331701 A1* | 10/2021 | Hur ........................ | H04W 4/44 |
| 2022/0114598 A1* | 4/2022 | Perkna .................. | G06Q 30/00 |
| 2024/0267840 A1* | 8/2024 | Ren ....................... | B60R 16/023 |

* cited by examiner

120

Status Bar

TRANSMITTED IDENTITY CONFIRMATION MESSAGE TO BLUELINK APP.
PLEASE CONTINUE AFTER COMPLETING IDENTITY CONFIRMATION (AUTHENTICATION).

NEXT >

LATER >

120

VEHICLE AND METHOD OF CONTROLLING THE SAME

CROSS-REFERENCE TO RELATED APPLICATION

This application claims the benefit of priority to Korean Patent Application No. 10-2022-0069634, filed on Jun. 8, 2022 in the Korean Intellectual Property Office, the disclosure of which is incorporated herein by reference.

BACKGROUND

1. Field

Embodiments of the present disclosure relate to a vehicle for providing a connected car service and to a method of controlling the same.

2. Description of the Related Art

Recently, a connected car service for providing a service in conjunction with a vehicle and a user terminal has been provided. A user may control the vehicle using the user terminal through the connected car service.

In addition, the connected car service may inform the user terminal of accidents and emergency situations, provide a vehicle management service through the user terminal, or provide a route guidance service.

However, to use the connected car service, a process for linking an account with the vehicle is required in addition to membership registration. There may be a user who does not receive the service due to the difficulty in linking the account.

SUMMARY

Therefore, it is an aspect of the present disclosure to provide a vehicle with improved usability for a user by inducing a linkage to an account through a software update of an audio/video/navigation (AVN) terminal. Thus, a user who has completed membership registration for a connected car service may easily link the account with the vehicle. It is another aspect of the present disclosure to provide a method of controlling such a vehicle.

Additional aspects of the disclosure are set forth in part in the description which follows and, in part, should be apparent from the description or may be learned by practice of the disclosure.

In accordance with one aspect of the present disclosure, a vehicle includes a communicator, an AVN terminal, and a controller. The controller is configured to control the communicator to request account information from a server in which the vehicle is registered among account information subscribed to a connected car service when updating software of the AVN terminal, control the AVN terminal to display the account information received from the server, control the communicator to request identity authentication from the server for account information selected by a user from the account information displayed on the AVN terminal, and link the vehicle with the account information received from the server and selected by the user based on information on whether authentication has been completed.

The controller may control the AVN terminal to display the account information received from the server when the user gets into and starts the vehicle.

The controller may control the AVN terminal to display a user name and a profile picture included in the account information received from the server.

The controller may control the communicator to request from the server the information on whether the authentication has been completed upon receiving authentication confirmation from the user through the AVN terminal.

The controller may link the vehicle with the account information selected by the user upon receiving authentication completion information from the server.

The controller may control the AVN terminal to output a message, which informs authentication incompletion, upon receiving authentication incompletion information from the server.

The controller may control the AVN terminal to output a message, which informs identity authentication, after outputting the message, which informs the authentication incompletion.

The controller may change vehicle settings based on vehicle setting information corresponding to the account information selected by the user when linking the vehicle with the account information selected by the user.

The controller may control the communicator to transmit and receive information for the connected car service to and from a user terminal linked with the account information selected by the user when linking the vehicle with the account information selected by the user.

The account information may include at least one of a user name, a phone number, a profile picture, an email address, or registered vehicle information.

In accordance with another aspect of the present disclosure, a method is provided of controlling a vehicle that includes a communicator and an AVN terminal. The method includes controlling the communicator to request account information from a server in which the vehicle is registered among account information subscribed to a connected car service when updating software of the AVN terminal. The method also includes controlling the AVN terminal to display the account information received from the server. The method further includes controlling the communicator to request identity authentication from the server for account information selected by a user from the account information displayed on the AVN terminal. The method also includes linking the vehicle with the account information received from the server and selected by the user based on information on whether authentication has been completed.

The controlling of the AVN terminal may include controlling the AVN terminal to display the account information received from the server when the user gets into and starts the vehicle.

The controlling of the AVN terminal may include controlling the AVN terminal to display a user name and a profile picture included in the account information received from the server.

The method may further include controlling the communicator to request the information from the server on whether the authentication has been completed upon receiving authentication confirmation from the user through the AVN terminal.

The linking of the vehicle with the account information selected by the user may include linking the vehicle with the account information selected by the user upon receiving authentication completion information from the server.

The method may further include controlling the AVN terminal to output a message, which informs authentication incompletion, upon receiving authentication incompletion information from the server.

The method may further include controlling the AVN terminal to output a message, which informs identity authentication, after outputting the message, which informs the authentication incompletion.

The linking of the vehicle with the account information selected by the user may include changing vehicle settings based on vehicle setting information corresponding to the account information selected by the user when linking the vehicle with the account information selected by the user.

The linking of the vehicle with the account information selected by the user may include controlling the communicator to transmit and receive information for the connected car service to and from a user terminal linked with the account information selected by the user when linking the vehicle with the account information selected by the user.

The account information may include at least one of a user name, a phone number, a profile picture, an email address, or registered vehicle information.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
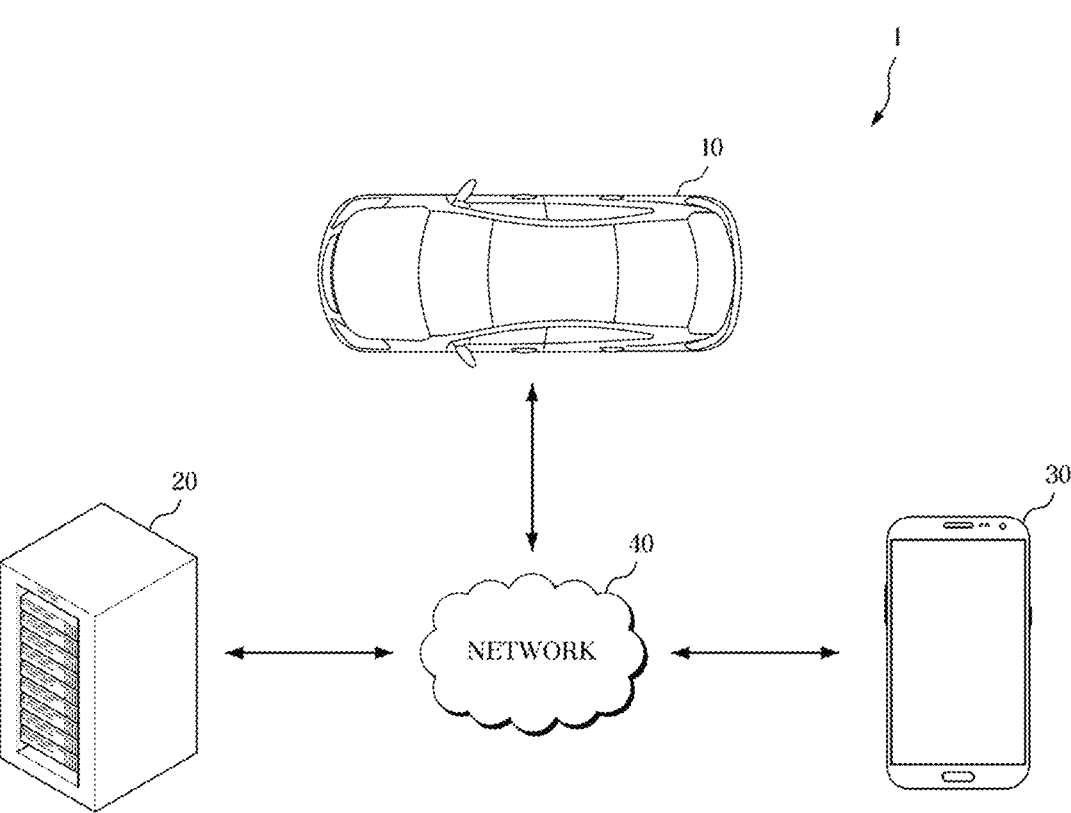
FIG. 1 shows a connected car service system according to one embodiment.

The same reference numerals refer to the same components throughout the specification. The specification does not describe all elements of the embodiments, and general contents in the art to which the present disclosure pertains or overlapping contents among the embodiments have been omitted.

Throughout the specification, when a certain portion is described as being "connected" to another portion, it includes not only a case in which the certain portion is directly connected to another portion but also a case in which it is indirectly connected thereto. Also, the indirect connection includes a connection through a wireless communication network.

In addition, when a certain portion is described as "comprising," "having," or "including" a certain component, it means that other components may be further included, rather than excluding the other components unless otherwise stated.

The singular expression includes the plural expression unless the context clearly dictates otherwise. When a component, device, element, or the like of the present disclosure is described as having a purpose or performing an operation, function, or the like, the component, device, or element should be considered herein as being "configured to" meet that purpose or to perform that operation or function.

In addition, terms such as "~unit," "~group," "~block," "~member," and "~module" may refer to a unit for processing at least one function or operation. For example, the terms may refer to at least one process hardware of a field-programmable gate array (FPGA) and an application specific integrated circuit (ASIC), at least one software stored in a memory, or at least one process processed by a processor.

The signs attached to each operation are used to identify each operation. These signs do not indicate the order between the operations and each operation is performed differently from the stated order unless the context clearly indicates a specific order.

Hereinafter, embodiments of a vehicle and a method of controlling the same according to one aspect are described in detail with reference to the accompanying drawings.

FIG. 1 shows a connected car service system according to one embodiment.

Referring to FIG. 1, a connected car service system 1 according to one embodiment includes a vehicle 10 and a user terminal 30 for providing a connected car service and includes a server 20 for storing and managing account information of a user subscribed to the connected car service.

The vehicle 10 may perform a linkage with the account information by requesting the account information from a server in which the vehicle 10 is registered in response to a software update of an audio/video/navigation (AVN) terminal (not shown). The vehicle 10 may transmit and receive information for the connected car service to and from the user terminal 30 corresponding to the account information through the linkage with the account information.

For example, the information for the connected car service may include information for remotely controlling the vehicle 10, information for informing various accidents and emergency situations, vehicle diagnosis information, route guidance information, and the like.

The server 20 may store and manage the account information of the user subscribed to the connected car service.

Specifically, when the server 20 receives a request for the account information from the vehicle 10, the server 20 may transmit the account information in which the vehicle 10 is registered to the vehicle 10 and control the linkage of the account information with the vehicle 10 in connection with identity authentication for the account information selected by the user.

The user terminal 30 may generate the user's account information according to membership subscription to the connected car service based on the user input and may transmit the account information to the server 20 so that the server 20 manages the account information.

In addition, the user terminal 30 may provide the user with a user interface, which may perform the identity authentication in the linkage with the vehicle 10.

Therefore, the vehicle 10 may induce the linkage with the account information selected by the user among the account information in which the vehicle 10 is registered upon updating software of the AVN terminal, thereby increasing the user's usability.

At this time, the vehicle 10, the server 20, and the user terminal 30 may transmit and receive information through a known type of a network 40.

Hereinafter, each configuration of the vehicle 10 is described and the linkage of the vehicle 10 with the account information is described in detail.

Figure 2:
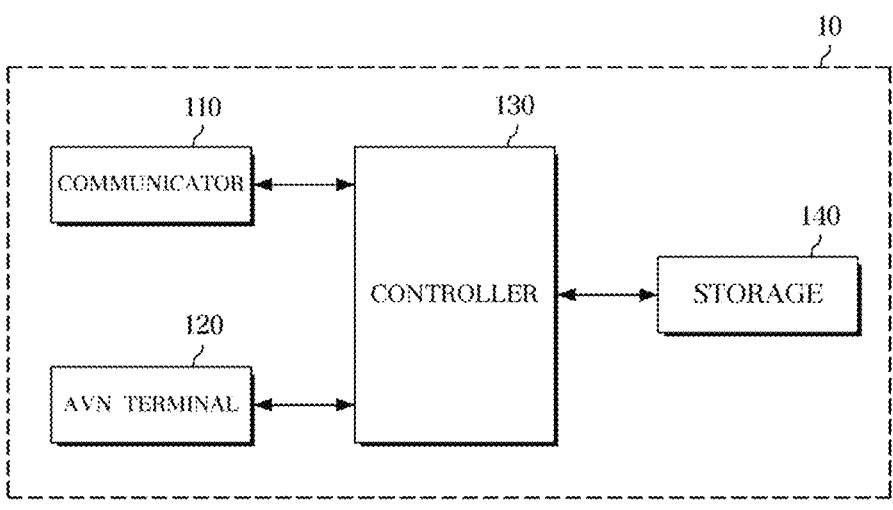
FIG. 2 is a control block diagram of a vehicle according to one embodiment.

FIG. 2 is a control block diagram of the vehicle 10 according to one embodiment.

Referring to FIG. 2, a vehicle 10 according to one embodiment includes: a communicator 110 for communicating with an external device; an AVN terminal 120, which may output various information and receive the user input; a controller 130 for controlling the linkage with a user account of the connected car service; and a storage 140 for storing various types of information.

The communicator 110 according to one embodiment may transmit and receive data to and from the server 20 and the user terminal 30. To this end, the communicator 110 may be provided as a known type of wireless communication module. For example, as the wireless communication module may be a module using the internet network or a mobile communication network.

The AVN terminal 120 according to one embodiment is a terminal for providing audio, video, and navigation functions and may include an input device and an output device. The output device may be provided as a display, and the input device may be a known type of input device or also a touch panel provided integrally with the display.

The AVN terminal 120 may be provided on a dashboard of the vehicle 10 to perform an interaction with the user and may operate as a user interface, which may induce the linkage with the account information of the connected car service.

The controller 130 according to one embodiment may control the linkage with the account information of the connected car service.

Specifically, upon updating the software of the AVN terminal 120, the controller 130 according to one embodiment may control the communicator 110 to request the account information in which the vehicle 10 is registered among account information of users subscribed to the connected car service to the server 20.

The controller 130 may update the software of the AVN terminal 120 upon receiving update information through over the air (OTA) or universal serial bus (USB) and may control the communicator 110 to request the account information from the server 20 in which the vehicle 10 is registered when updating the software of the AVN terminal 120.

However, in some embodiments, instead of using the software update of the AVN terminal 120 as a trigger, the controller 130 may also control the communicator 110 to request the account information to the server 20 according to the call from the user input or an external device (the server 20 or the user terminal 30).

The account information may correspond to the user's information entered by the user according to a membership registration procedure through the user terminal or a website. The account information may include at least one of a user name, a phone number, a profile picture, an email address, or registered vehicle information, or any combination thereof.

The controller 130 according to one embodiment may control the AVN terminal 120 to display the account information received from the server 20.

At this time, at least one piece of the account information may be displayed on the AVN terminal 120, and at least one of the user name and the profile picture included in the account information may be displayed.

For example, the controller 130 may control the AVN terminal 120 to display the account information received from the server 20 when the user gets into and starts the vehicle 10.

The controller 130 according to one embodiment may control the communicator 110 to request the identity authentication for the account information selected by the user from the account information displayed on the AVN terminal 120 to the server 20.

In this case, the server 20 may request the identity authentication from the user terminal 30 corresponding to the account information for which the identity authentication is requested. The user terminal 30 may receive an input for the identity authentication from the user by outputting the user interface for the identity authentication. At this time, the identity authentication may be performed in a known method, such as short message service (SMS) authentication or push authentication.

The user terminal 30 may transmit authentication completion information to the server 20 when the identity authentication is completed. The server 20 may store the authentication completion information received from the user terminal 30.

The controller 130 according to one embodiment may link the vehicle 10 with the account information received from the server 20 and selected by the user based on information on whether the authentication has been completed.

In this case, the linkage of the vehicle 10 with the account information may allow the vehicle 10 to be controlled through the account information of the user subscribed to the connected car service. The linkage of the vehicle 10 may mean that the vehicle 10 may be switched to a state of being controlled by transmitting and receiving the information between the vehicle 10 and the user terminal 30 corresponding to the account information of the user.

For example, upon receiving the authentication confirmation from the user through the AVN terminal 120, the controller 130 may control the communicator 110 to request the information from the server 20 on whether the authentication has been completed.

When receiving the authentication completion information from the server 20, the controller 130 may link the vehicle 10 with the account information selected by the user.

Conversely, upon receiving authentication incompletion information from the server 20, the controller 130 may control the AVN terminal 120 to output a message, which informs the authentication incompletion, and may then control the AVN terminal 120 to output a message, which informs the identity authentication. In other words, upon receiving the authentication confirmation through the AVN terminal 120 before the identity authentication through the user terminal 30 is completed, the controller 130 may inform that the authentication has not been completed and induce the identity authentication.

When linking the vehicle 10 with the account information selected by the user, the controller 130 according to one embodiment may change vehicle settings based on vehicle setting information corresponding to the account information selected by the user.

In other words, the controller 130 may receive the vehicle setting information corresponding to the account information from the server 20 or the user terminal 30 through the communicator 110 and may change the vehicle settings according to the vehicle setting information. In this case, the vehicle setting information may be information for setting various devices, such as a map, an air conditioner, a radio, a sound, a display, a traveling mode, a dashboard, or a head up display (HUD).

When linking the vehicle 10 with the account information selected by the user, the controller 130 according to one embodiment may control the communicator 110 to transmit and receive the information for the connected car service to and from the user terminal 30 linked with the account information selected by the user.

For example, the information for the connected car service may include information, such as remote air conditioning control, remote charging control, remote door open/lock, remote window control, parking position confirmation, destination transmission, vehicle state confirmation, voice recognition vehicle control, smart home Internet of Things (IoT) device control, airbag deployment notification, SOS emergency dispatch, theft tracking, theft alarm, driver attention notification, rear seat passenger notification, vehicle diagnosis, operation information, battery discharge notification, traffic information, route guidance, portal site area search, or final destination.

The controller 130 may include at least one memory in which a program for performing the above-described operation and an operation to be described below is stored and may include at least one processor for executing the stored program. When a plurality of memories and processors are provided, they may also be integrated on one chip or may also be provided at physically separate positions.

The storage 140 according to one embodiment may store various types of information required for controlling the vehicle 10 and in particular, may store information received by the server 20. To this end, the storage 140 may be provided as a known type of storage medium.

Each configuration of the vehicle 10 has been described above. Hereinafter, the execution of the linkage of the vehicle 10 with the account information of the connected car service is described in detail.

Figure 3:
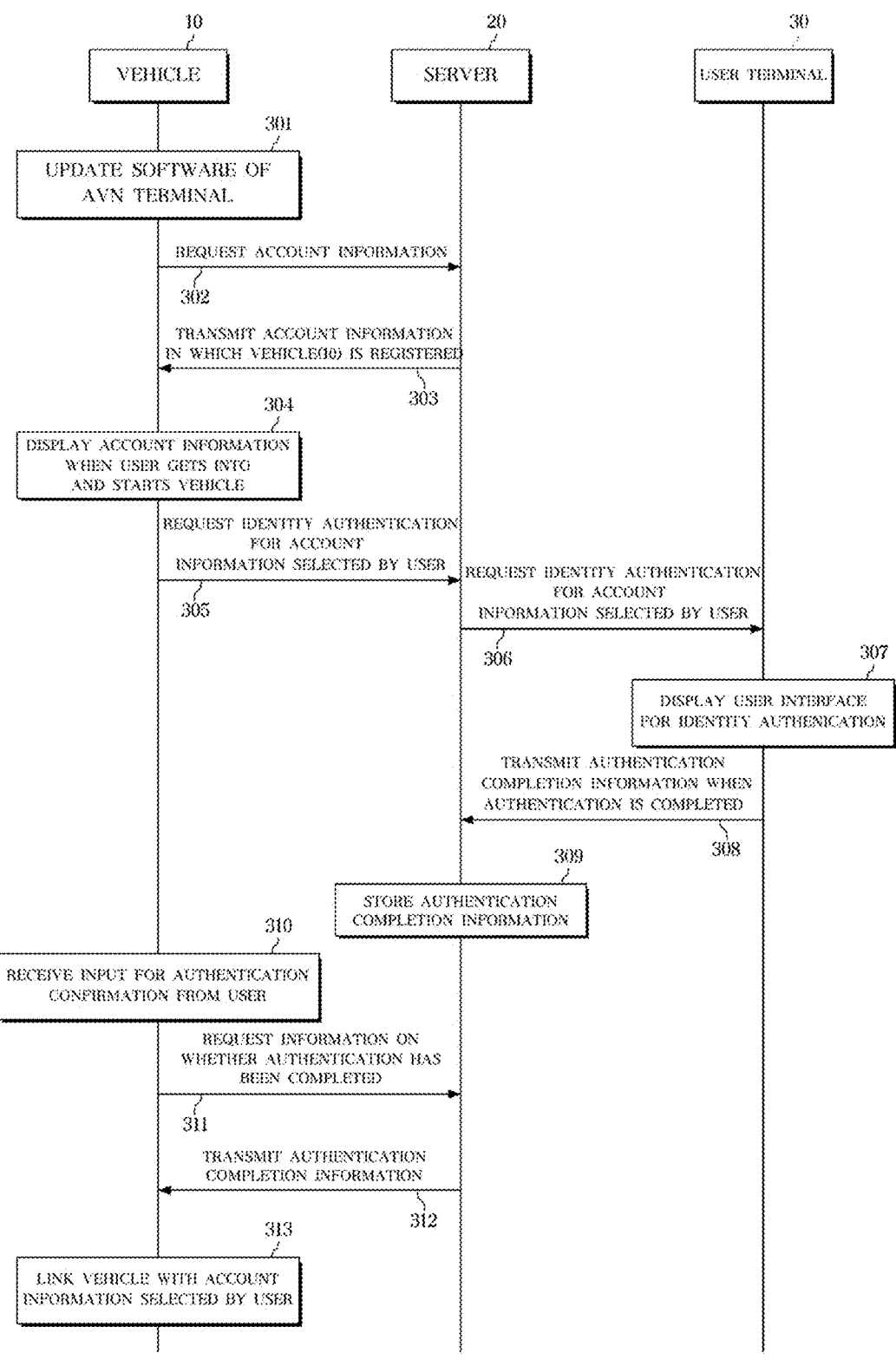
FIG. 3 is a signal flow diagram when a vehicle is linked with a user account of a connected car service after completing identity authentication according to one embodiment.
Figure 4:
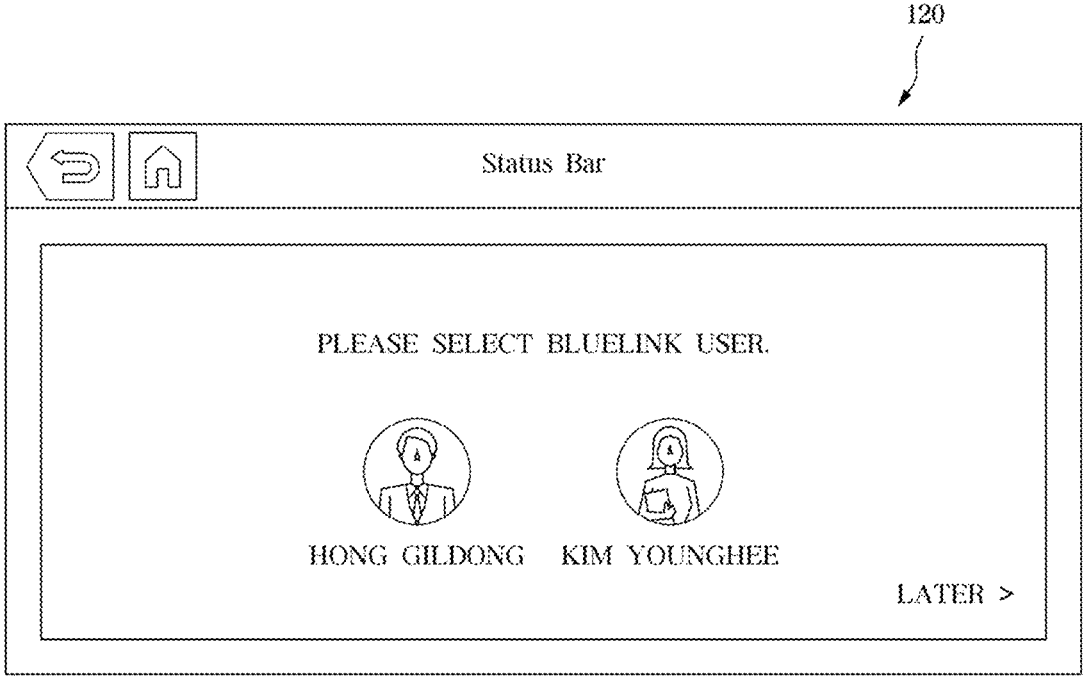
FIG. 4 shows one example in which a vehicle displays account information according to one embodiment.
Figure 5:
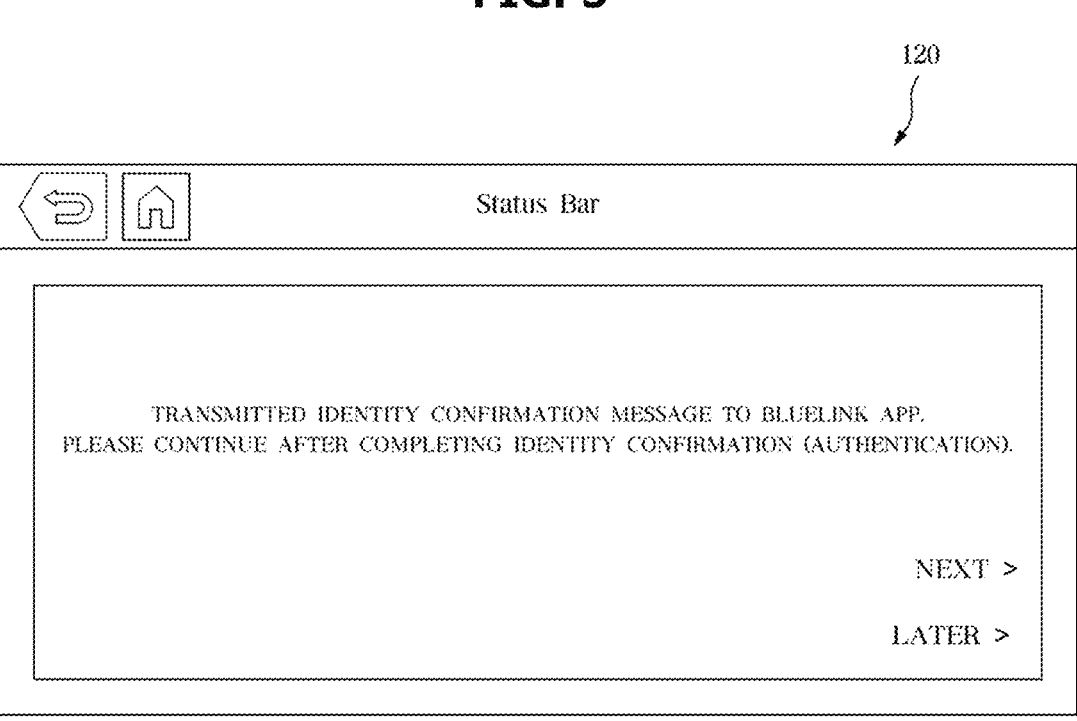
FIG. 5 shows one example in which a vehicle performs identity authentication on account information according to one embodiment.
Figure 6:
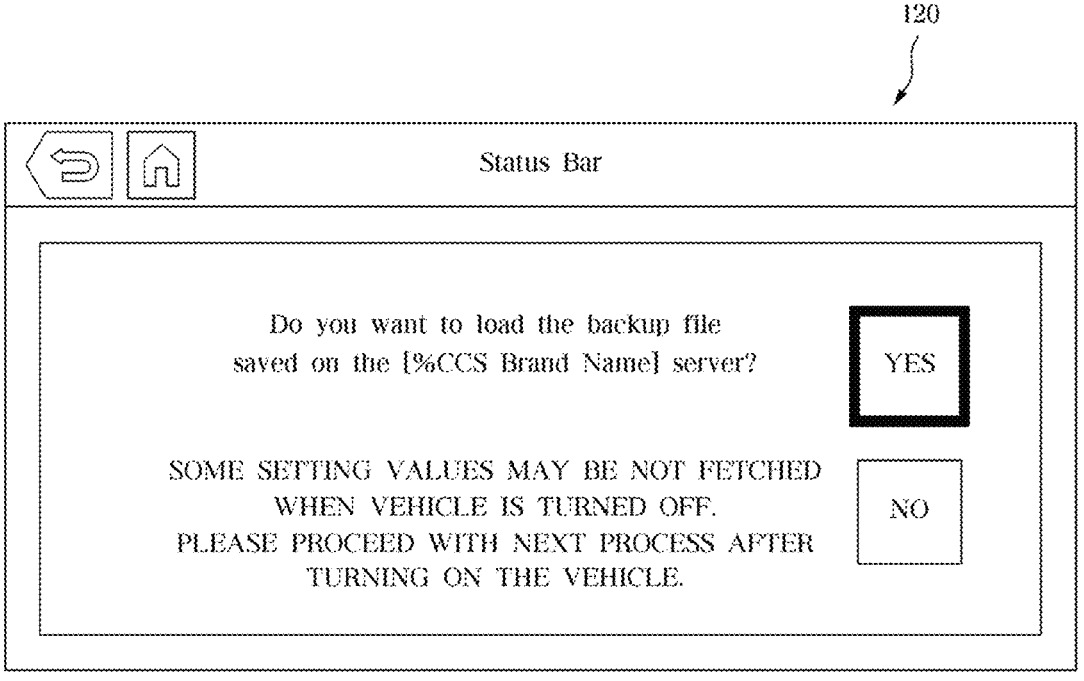
FIG. 6 shows one example in which a vehicle receives vehicle setting information as part of linkage with account information according to one embodiment.

FIG. 3 is a signal flow diagram when the vehicle 10 is linked with a user account of the connected car service after completing the identity authentication according to one embodiment. FIG. 4 shows one example in which the vehicle 10 displays account information according to one embodiment. FIG. 5 shows one example in which the vehicle 10 performs the identity authentication on the account information according to one embodiment. FIG. 6 shows one example in which the vehicle 10 receives vehicle setting information as part of linkage with account information according to one embodiment.

Referring to FIG. 3, the vehicle 10 according to one embodiment may update the software of the AVN terminal 120 (301) and then request the account information from the server 20 (302).

Specifically, upon updating the software of the AVN terminal 120, the vehicle 10 according to one embodiment may control the communicator 110 to request (i.e., send a request to the server for) the account information from the server in which the vehicle 10 is registered among the account information of users subscribed to the connected car service.

In other words, the vehicle 10 may update the software of the AVN terminal 120 upon receiving update information through the OTA or the USB and control the communicator 110 to request the account information from the server 20 in which the vehicle 10 is stored as the registered vehicle when completing to update the software of the ANV terminal 120.

However, in some embodiments, instead of using the software update of the AVN terminal 120 as a trigger, the vehicle 10 may also control the communicator 110 to request the account information to the server 20 according to the call from the user input or the external device (the server 20 or the user terminal 30).

The account information may correspond to the user's information entered by the user according to a membership registration procedure through the user terminal 30 or a website and include at least one of a user name, a phone number, a profile picture, an email address, or registered vehicle information.

In this case, the server 20 may transmit the account information in which the vehicle 10 is registered to the vehicle 10 (303) and the vehicle 10 may display the account information when the user gets into and starts the vehicle 10 (304).

In other words, the vehicle 10 according to one embodiment may control the AVN terminal 120 to display the account information received from the server 20.

In this case, as shown in FIG. 4, at least one piece of the account information may be displayed on the AVN terminal 120 and at least one of the user name and the profile picture included in the account information may be displayed.

The vehicle 10 according to one embodiment may request the identity authentication for the account information selected by the user (305).

In other words, the vehicle 10 may control the communicator 110 to request the identity authentication for the account information selected by the user from the account information displayed on the AVN terminal 120 to the server 20.

In this case, the server 20 may request the identity authentication for the account information selected by the user from the user terminal 30 corresponding to the account information for which the identity authentication is requested (306). The user terminal 30 may receive the input for the identity authentication from the user by outputting the user interface for the identity authentication (307). At this time, the identity authentication may be performed in a known method, such as short message service (SMS) authentication or push authentication.

The user terminal 30 may transmit the authentication completion information to the server 20 when the authentication is completed (308). The server 20 may store the authentication completion information received from the user terminal 30 (309).

When receiving the input for authentication confirmation from the user (310), the vehicle 10 according to one embodiment may request the information from the server 20 on whether the authentication has been completed 20 (311).

Specifically, as shown in FIG. 5, the vehicle 10 may notify transmission of an identity confirmation message to a connected car service (e.g., blue link) app to perform the identity authentication and control the AVN terminal 120 to display the user interface so as to request the authentication confirmation after the identity authentication from the user.

The user may input the authentication confirmation through the AVN terminal 120 after performing the identity authentication from the connected car service app of the user terminal 30 or the website.

At this time, the server 20 may transmit the authentication completion information received and stored from the user terminal 30 to the vehicle 10 (312). the vehicle 10 according to one embodiment may link the vehicle 10 with the account information selected by the user (313).

In this case, the linkage of the vehicle 10 with the account information may allow the vehicle 10 to be controlled through the account information of the user subscribed to the connected car service. The linkage of the vehicle 10 may mean that the vehicle 10 may be switched to a state of being controlled by transmitting and receiving the information between the vehicle 10 and the user terminal 30 corresponding to the account information of the user.

For example, the information for the connected car service may include information, such as remote air conditioning control, remote charging control, remote door open/lock, remote window control, parking position confirmation, destination transmission, vehicle state confirmation, voice recognition vehicle control, smart home Internet of Things (IoT) device control, airbag deployment notification, SOS emergency dispatch, theft tracking, theft alarm, driver attention notification, rear seat passenger notification, vehicle diagnosis, operation information, battery discharge notification, traffic information, route guidance, portal site area search, or final destination.

For example, as shown in FIG. 6, the vehicle 10 may confirm whether to receive back-up files (e.g., vehicle setting information) corresponding to the account information stored in the server 20 from the user when linked with the account information of the user subscribed to the connected car service. The vehicle 10 may receive the back-up files corresponding to the account information from the server 20 when confirming the reception of the back-up files from the user.

Therefore, when the vehicle 10 and the account information selected by the user are linked, the vehicle 10 may change the vehicle settings based on the vehicle setting information corresponding to the account information selected by the user.

In other words, the vehicle 10 may receive the vehicle setting information corresponding to the account information from the server 20 or the user terminal 30 through the communicator 110 and may change the vehicle settings according to the vehicle setting information. In this case, the vehicle setting information may be information for setting various devices, such as a map, an air conditioner, a radio, a sound, a display, a traveling mode, a dashboard, or a HUD.

Figure 7:
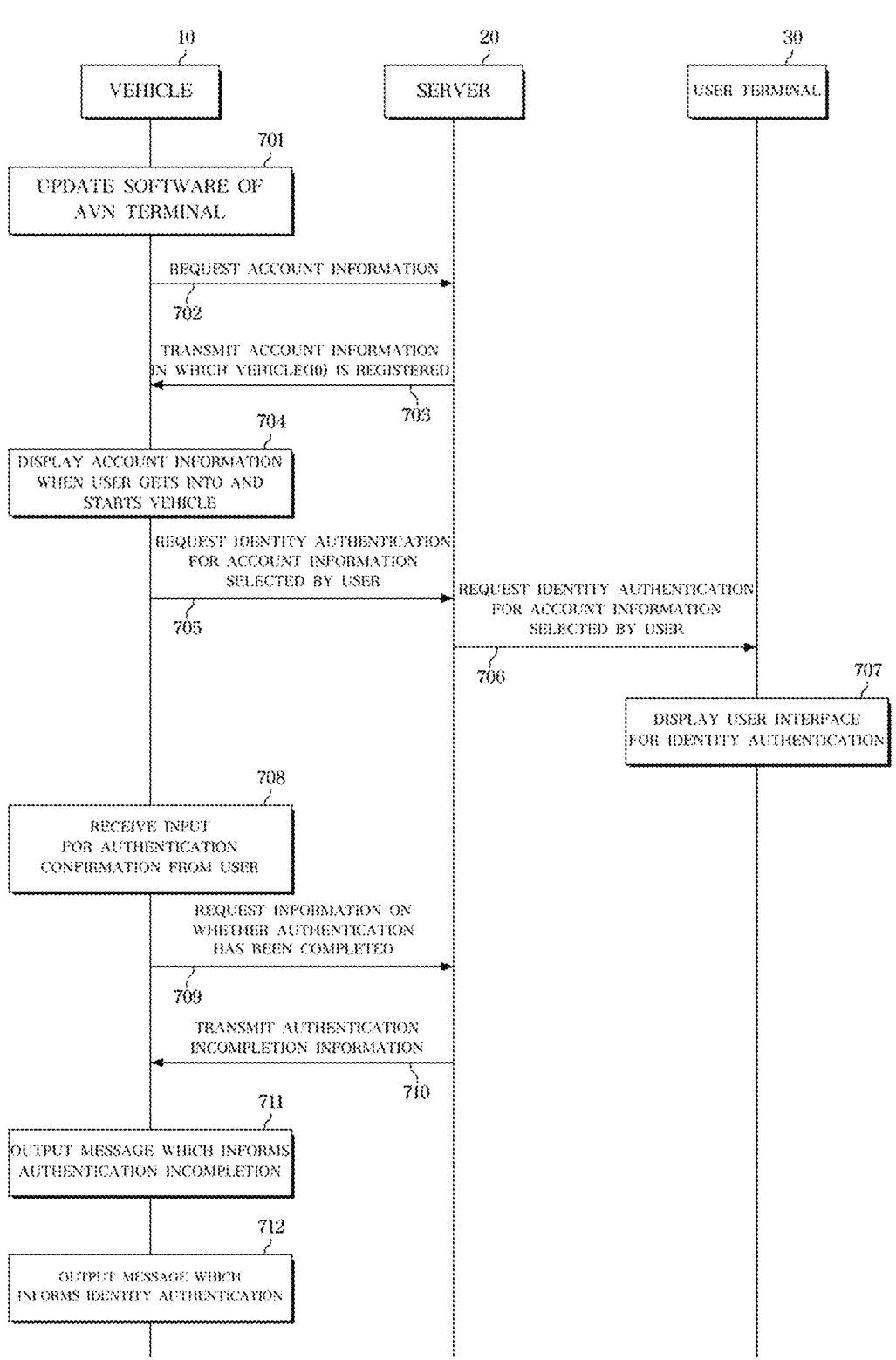
FIG. 7 is a signal flow diagram when a vehicle does not complete the identity authentication for a user account of a connected car service according to one embodiment.
Figure 8:
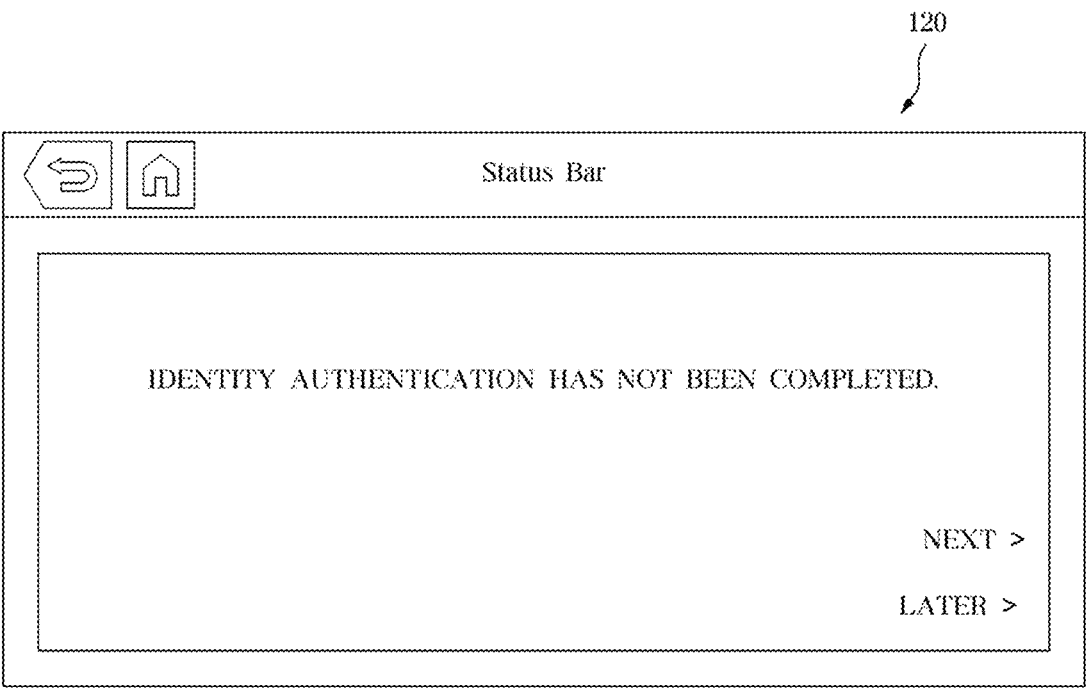
FIG. 8 shows one example in which a vehicle informs authentication incompletion according to one embodiment.

FIG. 7 is a signal flow diagram when the vehicle 10 does not complete the identity authentication for the user account of the connected car service according to one embodiment. FIG. 8 shows one example in which the vehicle 10 informs authentication incompletion according to one embodiment.

Referring to FIG. 7, the vehicle 10 according to one embodiment may perform a series of operations for the linkage with the account information of the connected car service. Since operations 701 to 707 in FIG. 7 correspond to the operations 301 to 307 in FIG. 3, detailed descriptions thereof have been omitted. Hereinafter, a description is provided with reference to FIG. 7 and differences from FIG. 3 are mainly described.

When receiving the input for the authentication confirmation from the user through the AVN terminal 120 (708), the vehicle 10 according to one embodiment may request information from the server 20 on whether the authentication has been completed (709).

The server 20 may transmit authentication incompletion information to the vehicle 10 upon receiving a request for the information on whether the authentication has been completed from the vehicle 10 in a state of not receiving the authentication completion information from the user terminal 30 (710).

As shown in FIG. 8, the vehicle 10 according to one embodiment may output a message, which informs the authentication incompletion upon receiving the authentication incompletion information from the server 20 (711). The vehicle 10 then may output a message (which may be the message shown in FIG. 5), which informs the identity authentication (712).

Hereinafter, an embodiment of a method of controlling the vehicle 10 according to an aspect is described. The vehicle 10 according to the embodiment described above may be used in the method of controlling the vehicle 10. Therefore, the contents described above with reference to FIGS. 1-8 may also be applied to the method of controlling the vehicle 10 in the same manner.

Figure 9:
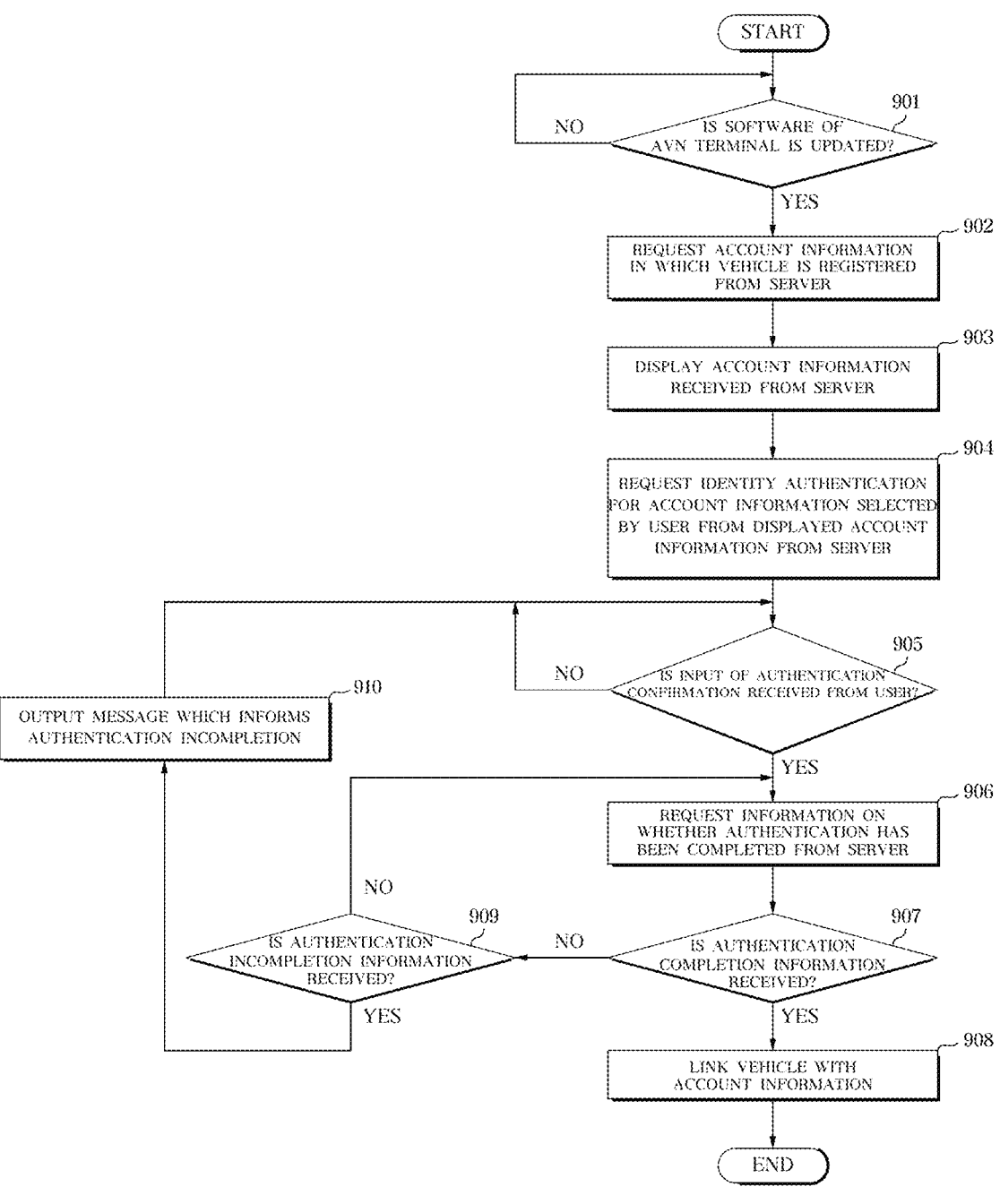
FIG. 9 is a flowchart when a vehicle is linked with a user account of a connected car service in a method of controlling a vehicle according to one embodiment.

FIG. 9 is a flowchart when the vehicle 10 is linked with the user account of the connected car service in a method of controlling the vehicle 10 according to one embodiment.

Referring to FIG. 9, upon updating the software of the AVN terminal 120 ("YES" in 901), the vehicle 10 according to one embodiment may request the account information in which the vehicle 10 is registered from the server 20 (902).

In other words, the vehicle 10 may update the software of the AVN terminal 120 upon receiving update information through the OTA or the USB and control the communicator 110 to request the account information from the server 20 in which the vehicle 10 is stored as the registered vehicle when completing to update the software of the ANV terminal 120.

However, in some embodiments, instead of using the software update of the AVN terminal 120 as a trigger, the vehicle 10 may also control the communicator 110 to request the account information to the server 20 according to the call from the user input or the external device (the server 20 or the user terminal 30).

The account information may correspond to the user's information entered by the user according to a membership registration procedure through the user terminal or a website. The account information may include at least one of a user name, a phone number, a profile picture, an email address, or registered vehicle information.

The vehicle 10 according to one embodiment may display the account information received from the server 20 (903) and may request the identity authentication for the account information selected by the user from the displayed account information from the server 20 (904).

In other words, the vehicle 10 may control the communicator 110 to request the identity authentication from the server 20 for the account information selected by the user from the account information displayed on the AVN terminal 120.

At this time, the server 20 may request the identity authentication for the account information selected by the user from the user terminal 30 corresponding to the account information for which the identity authentication is requested. The server may receive the input for the identity authentication from the user by outputting the user interface for the identity authentication. At this time, the identity authentication may be performed in a known method, such as SMS authentication or push authentication.

The user terminal 30 may transmit the authentication completion information to the server 20 when the authentication is completed. The server 20 may store the authentication completion information received from the user terminal 30.

When receiving the input of the authentication confirmation from the user ("YES" in 905), the vehicle 10 according to one embodiment may request the information from the server 20 on whether the authentication has been completed (906). Also, when receiving the authentication completion information ("YES" in 907), the vehicle 10 may perform the linkage with the account information (908).

Specifically, the vehicle 10 may notify transmission of an identity confirmation message to a connected car service (e.g., blue link) app to perform the identity authentication and control the AVN terminal 120 to display the user interface so as to request the authentication confirmation after the identity authentication from the user.

The user may enter the authentication confirmation through the AVN terminal 120 after performing the identity authentication from the connected car service app of the user terminal 30 or the website.

In this case, the server 20 may transmit the authentication completion information received and stored from the user terminal 30 to the vehicle 10.

When receiving the authentication completion information from the server 20, the vehicle 10 may be linked with the account information selected by the user.

Conversely, when failing to receive the authentication completion information from the server 20 ("No" in 907) and receiving the authentication incompletion information from the server 20 ("Yes" in 909), the vehicle 10 may output the message, which informs the authentication incompletion (910) and then re-perform an identity authentication procedure.

The disclosed embodiments may be implemented in the form of a recording medium for storing instructions executable by a computer. The instructions may be stored in the form of program code and may perform the operations of the disclosed embodiments by generating a program module when executed by a processor. The recording medium may be implemented as a computer-readable recording medium.

Computer-readable recording media include all types of recording media in which the instructions readable by the computer are stored. For example, there may be a read only memory (ROM), a random-access memory (RAM), a magnetic tape, a magnetic disc, a flash memory, an optical data storage device, and the like.

According to a vehicle and a method of controlling the same according to one aspect, it is possible to improve a user's usability by inducing a linkage to an account through a software update of an AVN terminal. Thus, a user who has completed membership registration for a connected car service may easily link the account with the vehicle.

The disclosed embodiments have been described with reference to the accompanying drawings as described above. Those having ordinary skill in the art to which the present disclosure pertains should understand that the present disclosure may be carried out in other forms than the disclosed embodiments without changing the technical spirit or essential characteristics of the present disclosure. The disclosed embodiments are illustrative and should not be construed as being restrictive.

What is claimed is:

1. A vehicle comprising:
a communicator;
an audio/video/navigation (AVN) terminal; and
a controller,
wherein the controller is configured to
control the communicator to request account information from a server in which the vehicle is stored as a registered vehicle among subscriber account information subscribed to a connected car service when updating software of the AVN terminal,
control the AVN terminal to display the account information received from the server,
control the communicator to request identity authentication from the server for account information selected by a user terminal from the account information displayed on the AVN terminal,
link the vehicle with the account information received from the server and selected by the user based on information on whether authentication has been completed, and
control the communicator to request the account information from the server in which the vehicle is stored as the registered vehicle while or after completing the updating of the software of the AVN terminal.

2. The vehicle of claim 1, wherein the controller is configured to control the AVN terminal to display the account information received from the server when the user gets into and starts the vehicle.

3. The vehicle of claim 1, wherein the controller is configured to control the AVN terminal to display a user name and a profile picture included in the account information received from the server.

4. The vehicle of claim 1, wherein the controller is configured to control the communicator to request the information from the server on whether the authentication has been completed upon receiving authentication confirmation from the user through the AVN terminal.

5. The vehicle of claim 4, wherein the controller is configured to link the vehicle with the account information selected by the user upon receiving authentication completion information from the server.

6. The vehicle of claim 5, wherein the controller is configured to control the AVN terminal to output a message, which informs identity authentication, after outputting a message, which informs authentication incompletion.

7. The vehicle of claim 4, wherein the controller is configured to control the AVN terminal to output a message, which informs authentication incompletion, upon receiving authentication incompletion information from the server.

8. The vehicle of claim 1, wherein the controller is configured to change vehicle settings based on vehicle setting information corresponding to the account information selected by the user when linking the vehicle with the account information selected by the user.

9. The vehicle of claim 1, wherein the controller is configured to control the communicator to transmit and receive information for the connected car service to and from a user terminal linked with the account information selected by the user when linking the vehicle with the account information selected by the user.

10. The vehicle of claim 1, wherein the account information includes at least one of a user name, a phone number, a profile picture, an email address, or registered vehicle information.

11. A method of controlling a vehicle including a communicator and an audio/video/navigation (AVN) terminal, the method comprising:
controlling the communicator to request account information from a server in which the vehicle is stored as a registered vehicle among subscriber account information subscribed to a connected car service when updating software of the AVN terminal;
controlling the AVN terminal to display the account information received from the server;

controlling the communicator to request identity authentication for account information selected by a user terminal from the account information displayed on the AVN terminal from the server;

linking the vehicle with the account information received from the server and selected by the user based on information on whether authentication has been completed, and controlling the communicator to request the account information from the server in which the vehicle is stored as the registered vehicle while or after completing the updating of the software of the AVN terminal.

12. The method of claim 11, wherein the controlling of the AVN terminal includes controlling the AVN terminal to display the account information received from the server when the user gets into and starts the vehicle.

13. The method of claim 11, wherein the controlling of the AVN terminal includes controlling the AVN terminal to display a user name and a profile picture included in the account information received from the server.

14. The method of claim 11, further comprising controlling the communicator to request the information from the server on whether the authentication has been completed upon receiving authentication confirmation from the user through the AVN terminal.

15. The method of claim 14, wherein the linking of the vehicle with the account information selected by the user includes linking the vehicle with the account information selected by the user upon receiving authentication completion information from the server.

16. The method of claim 15, further comprising controlling the AVN terminal to output a message, which informs identity authentication, after outputting a message, which informs authentication incompletion.

17. The method of claim 14, further comprising controlling the AVN terminal to output a message, which informs authentication incompletion, upon receiving authentication incompletion information from the server.

18. The method of claim 11, wherein the linking of the vehicle with the account information selected by the user includes changing vehicle settings based on vehicle setting information corresponding to the account information selected by the user when linking the vehicle with the account information selected by the user.

19. The method of claim 11, wherein the linking of the vehicle with the account information selected by the user includes controlling the communicator to transmit and receive information for the connected car service to and from a user terminal linked with the account information selected by the user when linking the vehicle with the account information selected by the user.

20. The method of claim 11, wherein the account information includes at least one of a user name, a phone number, a profile picture, an email address, or registered vehicle information.

* * * * *